US010592892B2

(12) United States Patent
Bhatia et al.

(10) Patent No.: US 10,592,892 B2
(45) Date of Patent: Mar. 17, 2020

(54) METHOD, COMPUTER-READABLE MEDIUM, AND MACHINE FOR REGISTERING A USER WITH A SUBSCRIPTION SERVICE USING A NETWORK-CONNECTED PRINTER

(71) Applicant: Hewlett-Packard Development Company, L.P., Houston, TX (US)

(72) Inventors: Rajesh Bhatia, Bangalore (IN); Kumaravel Ganesan, Dindigul (IN); Lenin Fernandes, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 761 days.

(21) Appl. No.: 15/116,085

(22) PCT Filed: Feb. 6, 2014

(86) PCT No.: PCT/US2014/015175
§ 371 (c)(1),
(2) Date: Aug. 2, 2016

(87) PCT Pub. No.: WO2015/119614
PCT Pub. Date: Aug. 13, 2015

(65) Prior Publication Data
US 2017/0161719 A1    Jun. 8, 2017

(51) Int. Cl.
*G06Q 20/00* (2012.01)
*G06Q 20/32* (2012.01)
(Continued)

(52) U.S. Cl.
CPC ....... *G06Q 20/3278* (2013.01); *G06F 3/1203* (2013.01); *G06F 3/1219* (2013.01);
(Continued)

(58) Field of Classification Search
CPC .................................... G06Q 30/0601–0645
(Continued)

(56) References Cited

U.S. PATENT DOCUMENTS 6,985,241 B1    1/2006  Haines et al.
7,124,097 B2 *  10/2006 Claremont ............. G06Q 30/00
                                                            705/26
(Continued)

FOREIGN PATENT DOCUMENTS

WO    WO-2013052641 A2    4/2013

OTHER PUBLICATIONS

Mans, Jack. "Printing Solution Saves Money for World Kitchen: New Label Printers, Labelers and Labels Keep World Kitchen Running Smoothly while Reducing Costs."Packaging Digest 45.5 (2008): 32(3). ProQuest. Oct. 29, 2019 . (Year: 2008).*

(Continued)

*Primary Examiner* — Brittney N Miller
*Assistant Examiner* — Kennedy Gibson-Wynn
(74) *Attorney, Agent, or Firm* — HP Inc. Patent Department

(57) ABSTRACT

A system and method for registering a user with a subscription service for a printer is described. A network-enabled printer can determine when a mobile computing device is brought into a sufficient proximity of the network-enabled printer. The network-enabled printer can receive account information for a user of the mobile computing device when the mobile computing device is brought into the sufficient proximity and transmit the account information to a remote provider in order to register the network-enabled printer and the user with the subscription service.

11 Claims, 5 Drawing Sheets

(51) Int. Cl.
*G06F 3/12* (2006.01)
*G06Q 20/18* (2012.01)
*G06Q 20/08* (2012.01)
*G06Q 30/06* (2012.01)

(52) U.S. Cl.
CPC .......... *G06F 3/1239* (2013.01); *G06F 3/1285* (2013.01); *G06F 3/1292* (2013.01); *G06Q 20/08* (2013.01); *G06Q 20/18* (2013.01); *G06Q 20/322* (2013.01); *G06Q 20/327* (2013.01); *G06Q 30/0635* (2013.01)

(58) Field of Classification Search
USPC .................................................. 705/26.1–27.2
See application file for complete search history.

(56) References Cited

U.S. PATENT DOCUMENTS

| | | | |
|---|---|---|---|
| 7,216,951 | B2 | 5/2007 | Garrana et al. |
| 8,363,086 | B1 | 1/2013 | Shah |
| 9,503,592 | B2 * | 11/2016 | Fein ................... H04N 1/00342 |
| 2002/0042747 | A1 | 4/2002 | Istvan |
| 2003/0010818 | A1 * | 1/2003 | Asawaka ................. G06F 17/60 235/379 |
| 2003/0046171 | A1 * | 3/2003 | Whale ..................... G06F 17/60 705/26 |
| 2004/0024703 | A1 | 2/2004 | Roskind |
| 2005/0253887 | A1 * | 11/2005 | Garrana ................. B41J 29/393 347/19 |
| 2008/0242274 | A1 | 10/2008 | Swanburg et al. |
| 2012/0044536 | A1 | 2/2012 | Hall et al. |
| 2012/0057193 | A1 | 3/2012 | Jazayeri et al. |
| 2013/0027741 | A1 * | 1/2013 | Liu ........................ G06K 15/02 358/1.15 |
| 2013/0135665 | A1 | 5/2013 | Griffith et al. |
| 2013/0138521 | A1 * | 5/2013 | Want ..................... G06Q 30/06 705/26.1 |
| 2013/0144789 | A1 | 6/2013 | Aaltonen et al. |
| 2013/0215467 | A1 * | 8/2013 | Fein ..................... H04B 5/0025 358/1.15 |
| 2013/0256403 | A1 * | 10/2013 | MacKinnon ............. G06K 5/00 235/375 |
| 2014/0270813 | A1 * | 9/2014 | Ignatchenko .......... G03G 15/55 399/12 |
| 2015/0278773 | A1 * | 10/2015 | Rolf ....................... G06Q 20/02 |

OTHER PUBLICATIONS

Smart Card Alliance, "Proximity Mobile Payments: Leveraging NFC and the Contactless Financial Payments Infrastructure," Sep. 2007, http://www.smartcardalliance.org/~ 39 pages.

Smith. Toshiba bakes TransferJet file transfer and wireless charging into touchscreen kiosk, charges phones and credit cards, Oct. 1, 2013, Engadget, ~ 5 pages.

* cited by examiner

METHOD, COMPUTER-READABLE MEDIUM, AND MACHINE FOR REGISTERING A USER WITH A SUBSCRIPTION SERVICE USING A NETWORK-CONNECTED PRINTER

BACKGROUND

When a user registers with a subscription service or signs up for a membership using a computing device, the user is required to provide a variety of information to a service provider, including personal and financial information. In many cases, the process for registering with the subscription service can be insecure, extensive, and time-consuming.

DETAILED DESCRIPTION

Figure 1:
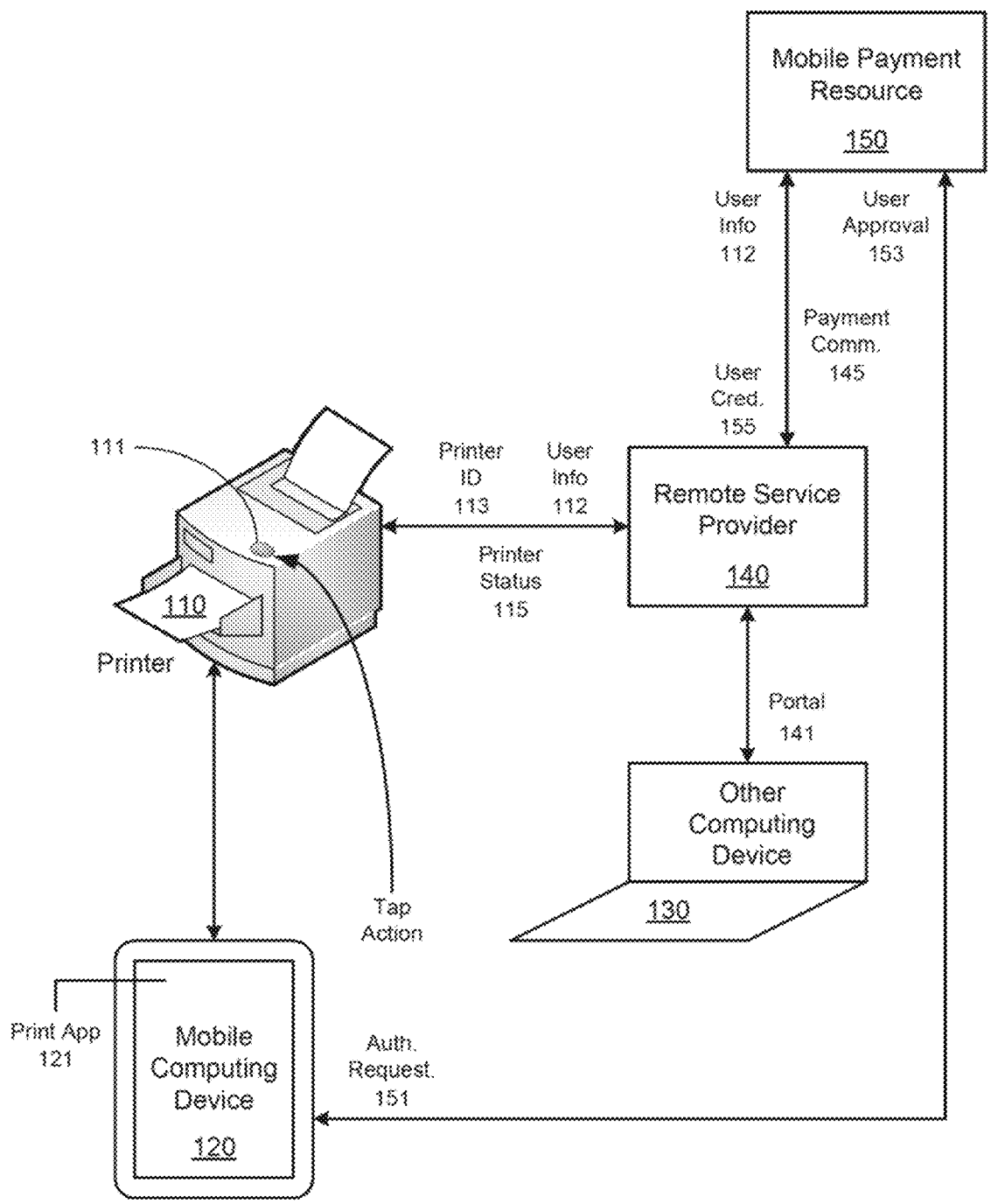
FIG. 1 illustrates an example system that includes a network-enabled printer for use with a subscription service.

Examples described herein provide for a system and method for enabling a user to register with a subscription service using the user's network-enabled printer. In some examples, a user can have a mobile payment account in which the user has previously configured payment information, billing information, and/or shipping information using a mobile computing device. As part of the registration process, the user can perform one or more actions with the user's mobile computing device and the user's network-enabled printer to register or enroll the printer and the user with an ink subscription service. In this manner, the user can use previously configured payment information in conjunction with the user's mobile computing device for registering with the ink subscription service without having to manually provide the user's payment, billing, and/or shipping information to the subscription service provider.

According to at least some embodiments, a user can register a network-enabled printer with a service provider so that the network-enabled printer can communicate with the service provider over one or more networks. As part of the registration process for a subscription service for the user's network-enabled printer, a user can input information using the user's mobile computing device (e.g., smartphone) or another computing device (e.g., a personal computer or laptop) and also cause the network-enabled printer to provide user information on behalf of the user.

The network-enabled printer can include a short-range wireless communication interface that can detect or determine when a mobile computing device is brought into a sufficient proximity of the network-enabled printer, and in response, receive account information for the user from the mobile computing device. The network-enabled printer can transmit the user's account information to the service provider in order to register the network-enabled printer and the user with the subscription service.

In some examples, the account information can be associated with a mobile payment resource that the user has an account with. The account information can correspond to a user name, email address, and/or a password, and enables the service provider to communicate with the mobile payment resource to determine and/or verify the payment information, billing information, and/or shipping information for the user. The account information can also enable the service provider to complete the registration process for the subscription service using the determined information. For example, the service provider can use the account information received from the network-enabled printer to communicate with the mobile payment resource to verify the user's payment information, billing information, and/or shipping information.

The network-enabled printer can also receive a print cartridge, such as an ink cartridge or a toner cartridge to enable the network-enabled printer to perform print operations. For example, the print cartridge can be provided by the service provider in connection with the user's registered subscription service. When the network-enabled printer receives the print cartridge, the network-enabled printer can verify the print cartridge (e.g., authenticate or authorize the print cartridge) before enabling print operations to be performed.

As used herein, "sufficient proximity" can correspond to a distance in which a short-term wireless communication interface is capable of reading or communicating with another corresponding interface, chip, or tag. For example, the sufficient proximity for a proximity card or smart card to be read by a corresponding reader device can be approximately 0 to 5 centimeters, while the sufficient proximity for a near-field communication (NFC) chip or tag to be read by a corresponding NFC tag reader can be approximately 0 to 10 centimeters. Other short-range wireless technologies can have different sufficient proximities as compared to other short-range wireless technologies (e.g., Bluetooth, RFID).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system that includes a network-enabled printer for use with a subscription service. For example, a user can register with a subscription service to receive print cartridges for the user's printer. The user can select an ink or toner subscription plan that is suitable for the user's printing needs and receive print cartridge(s) from the service provider accordingly.

For simplicity, FIG. 1 illustrates a printer 110, a mobile computing device 120, another computing device 130, a remote service provider 140, and a mobile payment resource 150. In the example of FIG. 1, a user is in control over and/or has ownership of the printer 110, the mobile computing device 120, and the other computing device 130. The printer 110 can correspond to a network-enabled printer that can communicate with one or more other devices or service providers via one or more networks. A printer as used herein can be a device that makes a representation of text or graphics on physical media. According to examples described herein, the printer 110 can be an ink printer, a laser printer, a multifunction printer (e.g., a printer that also includes other features, such as fax, scanning, and/or photocopying capabilities).

A user can purchase a printer 110 and connect the printer 110 to a network for printing purposes (e.g., to enable wireless printing from the mobile computing device 120 or another computing device 130). The user can also register the printer 110 with a remote service provider 140. The remote service provider 140 can correspond to an entity, such as the manufacturer of the printer 110 or a related entity, that provides printing services as well as an ink or toner subscription service. When the user registers the printer 110 with the remote service provider 140, the remote service provider 140 can assign the printer 110 an identifier (e.g., an email address for the printer and/or a printer identification (ID)) and store information about the printer 110 in a database. The printer 110 can communicate with the remote service provider 140 over one or more networks. For example, the printer 110 can receive print job requests from the remote service provider 140 and transmit status information 115 about the printer 110 to the remote service provider 140.

The user can also register or enroll with an ink (or toner) subscription service that is provided by the remote service provider 140. An ink subscription service enables a user to pay for an ink subscription plan in which ink cartridges can be mailed/shipped to the user's designated address (e.g., home, business, etc.). An ink subscription plan, for example, can correspond to an amount (e.g., $2.99, $4.99, etc.) for a predefined number of pages (e.g., 50 pages, 100 pages, etc.) that can be printed by the user using the user's printer 110. The user can sign up for automatic renewal in which the user pays the amount per month, per two months, per three months, etc., or manual renewal in which the user can order a plan whenever the user wants. Once the printer 110 determines that the ink or toner level is less than a threshold level (or that the ink level will allow only a certain number of pages for printing before running out), the printer 110 can communicate the ink level (via printer status information 115) to the remote service provider 140. The remote service provider 140 can then physically deliver (e.g., through shipping service) a replacement ink cartridge for the printer 110. By using the ink subscription service, the user can conveniently receive ink or toner for printing and always have the capability to print from his or her printer 110.

The user can initiate the registration process for the ink subscription service using the user's mobile computing device 120, such as a smartphone or tablet device, or some other computing device 130, such as a personal computer or laptop. For example, the remote service provider 140 can provide a portal 141 via a webpage (on a browser program) or a designated print application 121 (downloaded and stored on the mobile computing device 120) that the user can access using the personal computer 130 or the mobile computing device 120, respectively, to initiate the registration process for the subscription service. The registration process can require the user to create an account or profile with the remote service provider 140 and provide user information, such as the user's name, email address, and password for the account.

In some examples, the registration process can require the user to select an ink subscription plan from a plurality of different ink subscription plans. As discussed, a user can select from a variety of different plans based on the user's printing habits and printing frequency. A first plan, for example, can be suitable for an occasional print user, which enables the user to print up to 50 pages for $2.99 per month, while a second plan can be suitable for a frequent print user, which enables the user to print up to 300 pages for $9.99 per month.

As part of the registration process, the user can also provide other user information, such as user profile information, payment information, billing information, and/or shipping information. The payment and billing information can be used by the remote service provider 140 to charge the user for the ink subscription service rendered on behalf of the user, while the shipping information (which can be different from the billing information) can provide a designated location in which ink or toner cartridges can be physically mailed or shipped to the user. Depending on implementation, the user can provide the payment information, the billing information, and/or the shipping information by manually inputting the information via the portal 141 or through other user action.

In some cases, the user can have a mobile payment account (e.g., a mobile wallet account) with a mobile payment resource 150. The mobile payment account can be associated with the user's mobile computing device 120. For example, a mobile payment resource 150 can correspond to a telecommunication entity or another entity (e.g., Google Inc., of Mountain View, Calif.) that offers a mobile wallet application for a user. The mobile wallet application can use a short-range wireless technology or communication protocol to enable a device operating the mobile wallet application to communicate with a corresponding terminal. In some examples, a user's mobile computing device can include a near-field communication (NFC) interface (e.g., NFC tag reader or an NFC tag) that can communicate with a terminal that includes a corresponding NFC interface to exchange information between the mobile computing device and the terminal.

As discussed, a mobile wallet application allows a user to store virtual versions of the user's items for payment purposes, such as the user's credit card and/or debit card. The respective payment information corresponding to the credit card(s) and/or debit card(s) can be stored on the mobile computing device 120 and/or with the user's account at the mobile payment resource 150. The user may have provided his or her payment information, billing information, and/or shipping information to the mobile payment resource 150 in order to be able to use the mobile wallet account. A user can use the mobile wallet application on his or her mobile computing device 120 in order to pay for products or services via contactless payment by tapping on a corresponding terminal or bringing the mobile computing device 120 to a sufficient proximity of the corresponding terminal.

Because a user who has a mobile wallet account has already previously provided the user's payment information for at least one credit or debit card (such as a credit card number or account number, an expiration date, a security code) and/or the user's billing information for that card, the remote service provider 140 can provide, as part of the registration process, a mechanism to enable the user to use the mobile wallet account for registration with the subscription service. In one example, the remote service provider 140 can provide an option (via the portal 141) for a user to select his or her payment method for the subscription service. The user can select an option to provide payment information, billing information, and/or shipping information using the user's mobile wallet account as opposed to manually inputting the user's payment information, billing information, and/or shipping information.

When the user selects the option (via the portal 141) to provide his or her payment information, billing information, and/or shipping information using the mobile wallet, the remote service provider 140 can include information indicating the user's payment method (I.e., mobile wallet) with the user's account or profile. The remote service provider 140 can indicate to the user via the portal 141 that the registration for the subscription service is not yet complete and that the mobile wallet information is needed from the user. In order for the remote service provider 140 to obtain the user's payment information, billing information, and/or shipping information for purposes of registration, the user can perform a user action with the user's mobile computing device 120 (that is associated with the user's mobile wallet account) with the user's printer 110 that is registered with the remote service provider 140.

According to an example, the printer 110 can include a designated region 111 on the housing of the printer 110 that corresponds to a position of a short-range wireless technology interface. The short-range wireless technology interface can be positioned within the inner surface of the housing of the printer 110 at the designated region 111. The designated region 111 can be distinguished from the rest of the housing using visual indicators, such as light sources, images, text, etc. The short-range wireless technology interface can correspond to, for example, a near-field communication (NFC) interface or a radio frequency identification (RFID) interface that can detect and read a corresponding interface, tag, or chip. The user's mobile computing device 120 can include a corresponding short-range wireless technology interface, such as an NFC tag or chip, that can be used in conjunction with the user's mobile wallet account. The user can launch or open the user's mobile wallet application on the mobile computing device 120 and perform a user action to cause the user's payment information, billing information, and/or shipping information to be provided to the remote service provider 140 by tapping the mobile computing device 120 or bringing the mobile computing device 120 to a sufficient proximity of the designated region 111.

The printer 110 can determine or detect when the mobile computing device 120 is brought into sufficient proximity of the printer 110 (or the designated region 111 of printer 110). Depending on implementation, the short-range wireless technology interfaces of the printer 110 and/or the mobile computing device 120 can be active or passive. When the printer 110 determines that the mobile computing device 120 is brought into sufficient proximity of the printer 110, it can receive user account information from the mobile computing device 120. The account information can be received using the short-range wireless technology interfaces of the printer 110 and the mobile computing device 120. In one example, the account information for the user that is associated with the mobile wallet account of the mobile payment resource 150 can correspond to or include information about the mobile payment resource 150, the user's user name or email address, and/or the user's password associated with the user's mobile wallet account.

As an addition or an alternative, the account information can also include information about the mobile computing device 120, such as information corresponding to the subscriber identification module (SIM) card or another device identifier of the mobile computing device 120 (e.g., for use with OAuth, which can be used by a telecommunication mobile payment resource 150). In some examples, using information corresponding to the SIM card or another device identifier of the mobile computing device 120 can provide additional security (as this information is typically tamper-proof) for purposes of the remote service provider obtaining payment information. For example, providing information corresponding to the SIM card or another device identifier from the printer 110 to the remote service provider 140 can be more secure than manually inputting credit card information to be sent to remote service provider 140 that can be provided over an insecure network.

In response to receiving the user's account information, the printer 110 can transmit, over one or more networks, the account information 112 to the remote service provider 140 on behalf of the user. For example, the printer 110 can be in communication with the remote service provider 140 as a result of being previously registered with the remote service provider for purposes of wireless printing capabilities or for troubleshooting assistance. In one example, when the printer 110 detects the tap action and receives the user's account information, the printer 110 can initiate a communication with the remote service provider 140 (e.g., transmit a first message to) to notify the remote service provider 140 that information pertaining to a mobile payment account of the user will be transmitted. The printer 110 can transmit the user's account information 112 (and/or the printer ID 113) to the remote service provider 140. The user's account information 112 enables the remote service provider 140 to communicate with the mobile payment resource 150 to obtain, determine, and/or verify payment information (as well as billing and/or shipping information) for the user, and complete registration for the user and the printer 110 with the subscription service.

According to some examples, the remote service provider 140 can receive the user account information 112 (related to the user's mobile wallet account with the mobile payment resource 150) as well as a printer ID 113 from the printer 110. The remote service provider 140 can also receive other information from the printer 110 for identifying the user's account or profile with the remote service provider 140 (e.g., that was created as part of the registration process). The remote service provider 140 can communicate with the mobile payment resource 150 to determine the mobile wallet payment information for the user. In one example, the remote service provider 140 can communicate with the mobile payment resource 150 using the received account information 112, notifying the mobile payment resource 150 that the user of the mobile wallet account associated with the account information 112 wants to authenticate himself or herself for purposes of registering with the subscription service.

The mobile payment resource 150 can then communicate with the mobile computing device 120, which is associated with the user's mobile wallet account for authentication. According to an example, the mobile payment resource 150 can communicate an authentication request 151 to the mobile computing device 102 asking the user for verification that the user wishes to use his or her mobile wallet account for purposes of registration with the remote service provider 140. The authentication request 151 can be a message or a uniform resource locator (URL), that when viewed and/or selected, provides the user with an option to accept or decline. If the user provides an approval or acceptance 153, the mobile payment resource 150 can receive the approval 153 and generate a token or credential 155 on behalf of the user, and provide the user credential 155 to the remote service provider 140. The remote service provider 140 can receive the user credential 155 and store it in a database for use with registration and future payments with respect to the subscription service.

In one example, the receipt of the user credential 155 can indicate that the remote service provider has authorization to access the user's mobile wallet account for completing the registration process and/or to charge the user's mobile wallet account when it comes time for payment. In this manner, the user (via the mobile computing device 120), the remote service provider 140, and the mobile payment resource 150 can engage in a three-party handshaking authorization or authentication process for security purposes.

Depending on implementation, the user's payment information, billing information, and/or shipping information (i) can be included with the user's credential 155 from the mobile payment resource 150, (ii) can be received by the remote service provider 140 along with the user's credential 155 from the mobile payment resource 150, (iii) can be received by the remote service provider 140 after the user's credential 155 is received from the mobile payment resource 150, or (iv) can be accessed and retrieved by the remote service provider 140 from the mobile payment resource 150. The remote service provider 140 can include the user's payment information, billing information, and/or shipping information with the user's account or profile with the subscription service for completing the registration process.

In this manner, the user can perform a user action (e.g., tapping the mobile computing device 120 on the printer 110) to cause the user's payment information, billing information, and/or shipping information to be securely provided to the remote service provider 140. The printer 110 can behave as a secure proxy on behalf of the user by providing user information to the remote service provider 140 for purposes of registering with a subscription service. The user does not have to manually provide payment information, billing information, and/or shipping information as part of the registration process, and the remote service provider 140 can communicate with the mobile payment resource 150 to authenticate the user and determine or verify the payment information of the user.

Once the registration process for the subscription service has been completed, the user's subscription service can begin based on the selected plan. The remote service provider 140 can physically ship an ink or toner cartridge that can be used by the printer 110 to the user's designated shipping address. The printer 110 can receive the ink or toner cartridge and verify the cartridge based on the cartridge information. If the cartridge is verified, the user can perform print operations using the printer 110. The printer 110 can monitor its status and ink or toner status and provide the printer status information 115 to the remote service provider, including how many pages have been printed and the ink or toner level. When payment is due in connection with the user's ink or toner subscription service, the remote service provider 140 can transmit a payment communication 145 to the mobile payment resource 150 and use the stored user's credential 155 for purposes of charging the user and receiving payment for the subscription service.

In some examples, the user may have selected a plan for the subscription service in which manual renewal is required for continued print operations. When the user wants to manually renew a plan or order a plan, the user can also operate the mobile computing device 120 and perform a user action with respect to the printer 110. For example, the user can operate a designated print application 121 on the mobile computing device 120. The user can view and select an option to renew the user's previous plan or select a new plan using the print application 121. As a method of verifying the order, confirming the plan change, and/or paying for the plan, the user can tap the mobile computing device 120 on (or bring the mobile computing device 120 into a sufficient proximity of) the designated region 111 of the printer 110. When the printer 110 detects and determines that the mobile computing device 120 is brought into sufficient proximity of the printer 110, the printer 110 can receive the user's account information corresponding to the user's mobile wallet account.

Depending on implementation, information about the user's renewal and/or selection of a new plan can be provided to the remote service provider 140 via the portal 141 (e.g., in this example, from the print application 121) and/or in response to the user tapping the mobile computing device 120 on (or bringing the mobile computing device 120 into a sufficient proximity of) the printer 110 or in response to user input on the print application 121. In another example, information about the user's renewal and/or selection of a new plan as well as the user's account information can be received by the printer 110 using the short-range wireless technology interface. The printer 110 can then provide the information about the user's renewal and/or selection of a new plan to the remote service provider 140 along with the user's account information from the printer 110.

The remote service provider 140 can then modify or edit the user's account or profile with the subscription service and communicate with the mobile payment resource 150 using the user's credential 155. The remote service provider 140 can charge the user for the manual renewal of the plan and receive payment for the subscription service by deducting the appropriate amount for the plan from the user's mobile wallet account. In other examples, the user can authorize the remote service provider 140 to charge the user's mobile wallet account via the portal 141. For example, the user can authorize the remote service provider 140 using the print application 121 on his or her mobile computing device 120 and the remote service provider 140 can communicate with the mobile payment resource 150 using the user's credential 155 to deduct payment from the user's mobile wallet account.

Printer System

Figure 2:
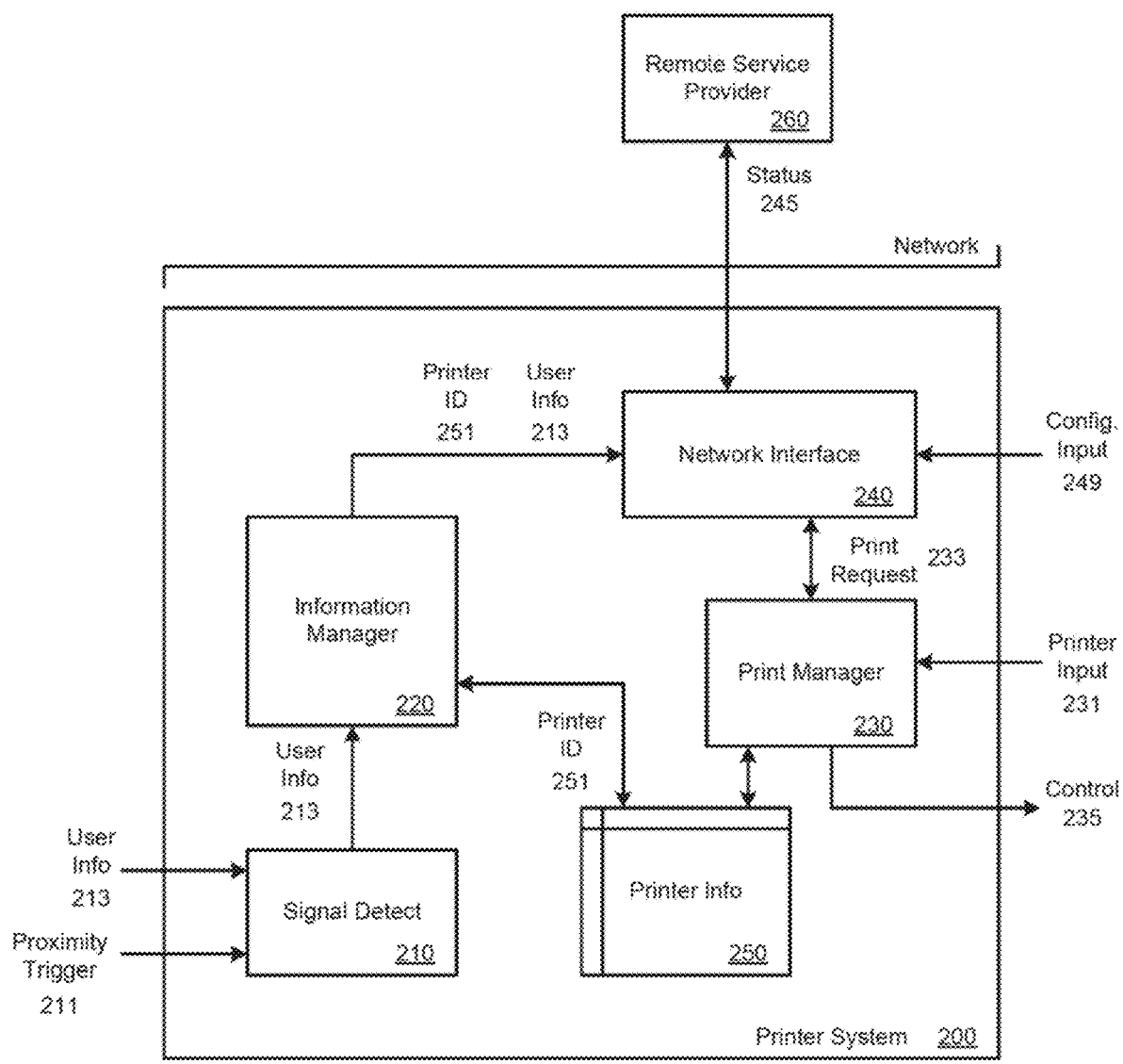
FIG. 2 illustrates an example printer system for use with a subscription service.

FIG. 2 illustrates an example printer system for use with a subscription service. In some examples, the printer system can provide a user with a mechanism to provide a user's payment information, billing information, and/or shipping information to a remote service provider for purposes or registering with a subscription service. In one example, printer system 200 of FIG. 2 can be implemented by the printer 110 of FIG. 1.

Printer system 200 includes a signal detect 210, an information manager 220, a print manager 230, a network interface 240, and a printer information data store 250. The components of printer system 200 can combine to receive user account information from a mobile computing device for purposes of registering the user and the user's printer system 200 with a subscription service. Logic can be implemented with various applications (e.g., software) and/or with firmware or hardware of a printer that implements printer system 200. For example, the printer 110 of FIG. 1 can include hardware components, such as a processor, a memory resource, and a network interface, that can perform or implement functionalities of printer system 200 of FIG. 2. The memory resource of the printer 110 can store instructions that can be executed by the processor of the printer 110 to implement components described in printer system 200.

Printer system 200 can communicate, over one or more networks (e.g., wirelessly or using a wireline), with a remote service provider 260 and/or a user's computing device, using a network interface 240. The network interface 140 can enable and manage communications between printer system 200 and the remote service provider 260. Printer system 200 can also communicate with a mobile computing device of a user (not shown in FIG. 2) using a signal detect 210.

The signal detect 210 can receive information, such as the user's account information 213 that is associated with the user's mobile wallet account at a mobile wallet resource, from the user's mobile computing device. The account information 213 can correspond to a user name, an email address, and/or a password. In some examples, the account information 213 (as well as other information) can be received as a communication between using short-range wireless technology, such as NFC, in response to a proximity or detection trigger 211. The printer that implements printer system 200 and the mobile computing device can each include an NFC interface. The signal detect 210 can receive a proximity trigger 211 when the mobile computing device is brought into a sufficient proximity of the printer (e.g., the NFC interfaces are sufficiently close to one another) and can receive the account information 213 from the mobile computing device. The signal detect 210 can provide the account information 213 to the information manager 220.

According to some examples, the information manager 220 can manage communications to be sent to the remote service provider 260. The information manager 220 can operate a buffer storage to store the account information 213 for purposes of formatting or packaging the account information 213 for transmission to the remote service provider 260. In one example, the information manager 220 can also retrieve the printer ID 251 from the printer information 250 data store. The printer information 250 data store can also include information about the printer, such as manufacturer and model information, software or firmware version information, configuration and setting information for the printer, network address (e.g., IP address), protocol information, etc. The information manager 220 can provide the account information 213 and/or the printer ID 251 to the remote service provider 260 via the network interface 240.

For example, in response to the signal detect 210 receiving the user's account information 213, the information manager 220 can receive the user's account information 213 from the signal detect 210 and can establish a communication session with the remote service provider 260 using the network interface 240. The information manager 220 can transmit the account information 213 and/or the printer ID 251 to the remote service provider 260 via the communication session. The information manager 220 can also transmit a message (e.g., before, after, concurrently) to the remote service provider 260 to notify the remote service provider 260 that the information pertains to a mobile payment account of the user to be used as part of a registration process to register the printer and the user with a subscription service and/or as part of a plan renewal or changing process.

The account information 213 enables the remote service provider 260 to communicate with a mobile payment resource (not shown in FIG. 2), that the user has a mobile wallet account with, to verify payment information for the user for the registration process. Once the remote service provider 260 has determined and verified the user's payment information (as well as billing and/or shipping information), the registration process with the subscription service can be completed.

The print manager 230 can perform operations for controlling the use of the printer that implements printer system 200 and for monitoring printer status and functionality. For example, the print manager 230 can monitor printer status and functions (via one or more printer inputs 231 provided by hardware components or sensors of the printer), such as whether there are any errors or problems (e.g., paper jams, low ink, etc.) or whether the printer is currently being in use, and can manage print jobs for the printer. The print manager 230 can provide status information 245 to the remote service provider 260, such as ink levels or toner levels being at or below a particular threshold. By providing status information 245 to the remote service provider 260, the remote service provider 260 can determine when a replacement ink cartridge is necessary for the user in operating the printer and ship the cartridge according to the user's subscription service to the user.

The print manager 230 can also manage the printer and the printer's operations based on inputs provided by the user via configuration input 249 and printer input 231. For example, the print manager 230 can receive printer input 231 from one or more sensors or detection mechanisms of the printer. Using the printer input 231, the print manager 230 can determine if a user is adding more paper or attempting to change an ink or toner cartridge. The print manager 230 can also receive a print job or request 233 from the remote service provider 260 or from a user's computing device via the network interface 240, and control both hardware and/or software components of the printer for performing print operations using control signals 235.

By using printer system 200, the printer of the user can behave as a secure proxy of the user by providing account information to the remote service provider 140 for purposes of registering with a subscription service and renewing plans with the subscription service on behalf of the user.

Service Provider System

Figure 3:
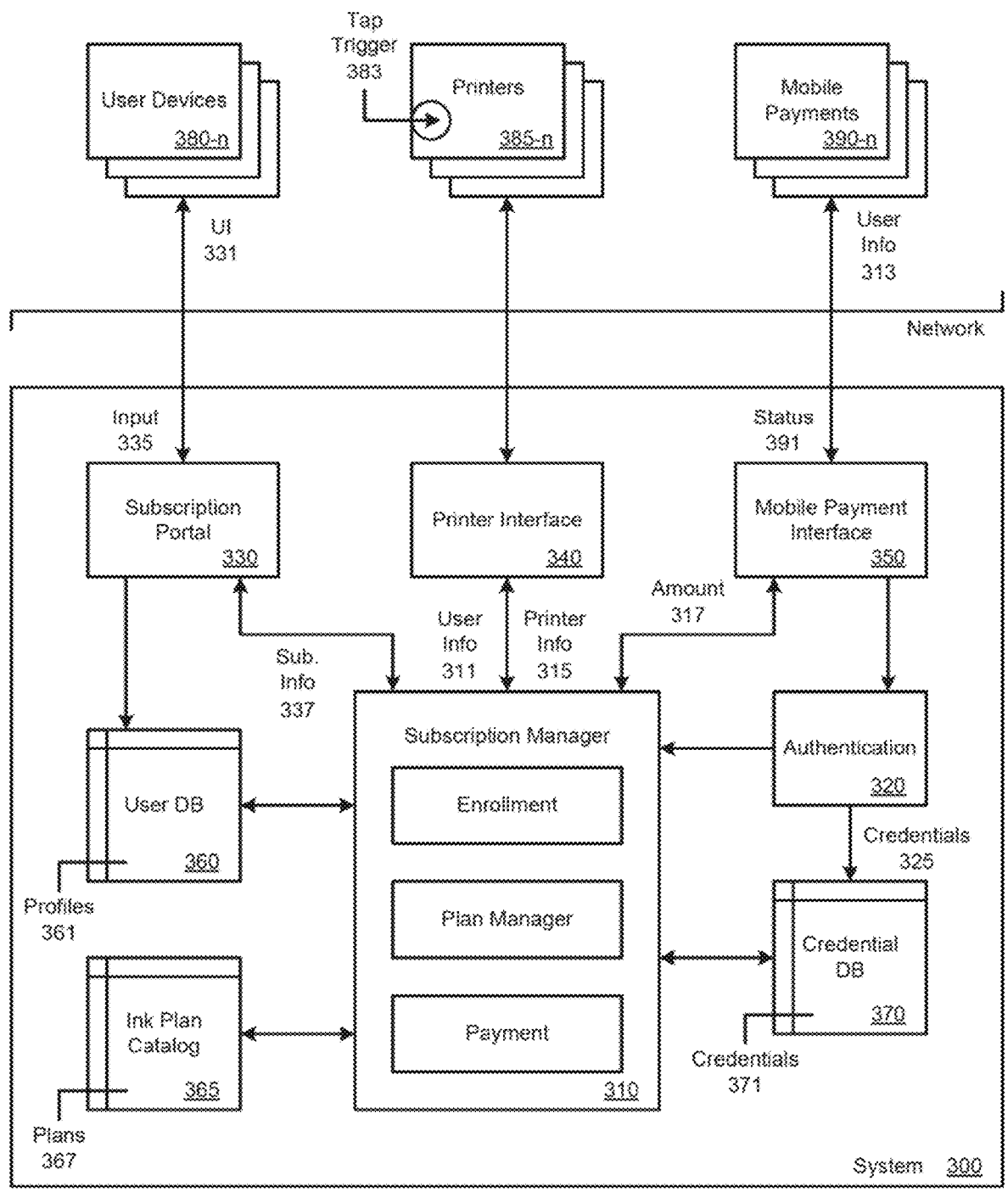
FIG. 3 illustrates an example system to enroll a user for a subscription service.

FIG. 3 illustrates an example system to enroll a user for a subscription service. According to an example, system 300 can provide a registration process for an ink or toner subscription service to a user and provide the ink or toner subscription service according to the user's selected plan. In one example, system 300 of FIG. 3 can be implemented by the remote service provider of FIG. 1. The components of system 300 can combine to provide a portal to receive user input as part of a registration process and to receive user information from a user's network-enabled printer as part of the registration process. Logic can be implemented with various applications (e.g., software) and/or with firmware or hardware of a computer system that implements system 300.

Depending on implementation, one or more components of system 300 can be implemented on a computing device, such as a server, laptop, PC, etc., or on multiple computing devices that can communicate with a plurality of different devices over one or more networks. In some examples, a computing device can operate or execute an application, such as a subscription registration program, to perform one or more of the processes described by the various components of system 300. System 300 can also be implemented through other computer systems in alternative architectures (e.g., peer-to-peer networks, etc.).

System 300 can communicate, over one or more networks via a network interface (e.g., wirelessly or using a wireline), with printers 385 and mobile payment resources 390 using a printer interface 340 and a mobile payment interface 350, respectively. The printer interface 340 and the mobile payment interface 350 can each enable and manage communications between system 300 and each of the respective devices. In addition, system 300 can also communicate with user devices 380 using a subscription portal 330 or an application interface.

System 300 includes a subscription manager 310 that manages the different subscription plans for different users that have registered or enrolled with the subscription service. The subscription manager 310 can provide a registration or enrollment process in which a user can register with an ink or toner subscription service with use with his or her printer. In one example, the enrollment component of the subscription manager 310 can communicate with the subscription portal 330 to provide a portal for a user to register with the subscription service. Using one of a plurality of computing devices 38, a user can access the portal via a webpage that is displayed on a computing device, such as a personal computer or laptop, or via a service application that is operated on a mobile computing device, such as a smartphone.

The subscription portal 330 provides a user interface 331 in which the user can provide information, such as the user's name, email address, and/or password, for use with the user's account or profile with the subscription service. The user's inputs 335 corresponding to the user information for registration can be stored in the user database 360 of system 300. In one example, the enrollment component of the subscription manager 310 can receive the user's inputs 335 and create a profile 361 for the user with the subscription service (using the user's subscription information 337, e.g., email address and password of the user). The subscription manager 310 can also access information from the ink plan catalog 365 to provide the user with different subscription plans 367. The user can access the user interface 311 to select a plan that is best suited for his or her printing frequency and behavior. The enrollment component can store the various received user inputs with the user's profile 361 in the user database 360.

The subscription portal 330 can also provide options on the user interface 331 to enable the user to manually input the user's payment information, billing information, and/or shipping information or to use the user's preexisting mobile wallet account for providing the user's payment information, billing information, and/or shipping information. If the user chooses to manually provide the user's payment information, billing information, and/or shipping information using the user interface 331, the enrollment component can include the information with the user's profile 361 and provide a message to the user's device 380 that the registration has been completed.

As an alternative, the user can interact with the user's network-enabled printer 385 to provide user account information to system 300 and enable system 300 to obtain and verify the user's payment information, billing information, and/or shipping information for purposes of registration. When the user selects the option to use the mobile wallet, the enrollment component can indicate in the user's profile 361 that the payment method will be the user's mobile wallet account, and maintains information with the profile 361 that the registration is not yet complete (until authorization or a credential is received by the user's mobile payment resource 390).

As discussed, the user can register the user's network-enabled printer 385 with system 300 (e.g., before performing the registration process with the subscription service with system 300). The user can launch or operate a mobile wallet application on his or her mobile computing device 380 and perform a user action with respect to the user's network-enabled printer 385. The user action can be a tap trigger 383 that corresponds to the user tapping the mobile computing device 380 on (or brining the mobile computing device 380 within a sufficient proximity of) a designated region of the network-enabled printer 385. When the network-enabled printer 385 detects and determines that the mobile computing device 380 is brought into a sufficient proximity of the network-enabled printer 385, the network-enabled printer 385 can receive user account information from the mobile computing device 380. In response, the subscription manager 310 can receive, via the printer interface 340, user account information 311 from the network-enabled printer 385 via the printer interface 340. As an addition or an alternative, the subscription manager 310 can also receive printer information 315, such as the printer ID, of the network-enabled printer 385 along with the user account information 311.

In order to complete the registration process for the user, the enrollment component of the subscription manager 310 transmits the user account information 313 (as well as other information) via the mobile payment interface 350 to the appropriate mobile payment resource 390 in order to receive verification and permission to use the mobile wallet account of the user for the subscription service. The mobile payment resource 390, which the user has a mobile wallet account with, can communicate with the user for authenticating the user and for determining permission for the subscription service. Once the mobile payment resource 390 receives authorization from the user, the mobile payment resource 390 can transmit the user's credential 325 to system 300.

The authentication component 320 can receive the credential 325 for the user and store the credential in a credential database 370. The credential database 370 can include a plurality of credentials 371 for a plurality of different users that subscribe to the ink or toner subscription service. The credentials 371 can correspond to those users who have chosen to pay for the subscription service using a mobile wallet account and whose respective mobile payment resource 390 have provided authorization and authentication. The authentication component 320 can provide information about the receipt of the credential for the user to the subscription manager 310. In addition, in some examples, the subscription manager 310 can receive the user's payment information, billing information, and/or shipping information from the respective mobile payment resource 390. The enrollment component can include the user's payment information, billing information, and/or shipping information with the user's profile 361 in the user database 360 in completing the registration process for the user. According to some examples, the user's profile 361 can include the user's personal information, user name and password, the user's printer information and printer ID, the user's selected subscription plan, payment information, billing information, and/or shipping information.

After registration for the user has been complete, the payment component of the subscription manager 310 can also charge the user after the subscription plan's period begins using the user's mobile wallet account. The payment component can communicate a payment amount 317 with the appropriate mobile payment resource 390 using the user's credential 325.

The subscription manager 310 can also monitor the user's network-enabled printer 385 in connection with the subscribed plan. The user's network-enabled printer 385 can provide information about how many pages have been printed by the user during a specified duration in time or the ink or toner level as compared to a threshold for the network-enabled printer 385. In some examples, the user may want to manually renew or change a subscription plan. The user can again operate the mobile computing device 380 and perform a user action (e.g., tap trigger 383) with respect to the network-enabled printer 385 to manually renew or change a plan.

In one example, the user can operate a designated print application on the mobile computing device 380 and select an option to renew the user's previous plan or select a new plan using the print application. The user can verify the order, confirm the plan change, and/or pay for the plan by tapping the mobile computing device 380 on (or bring the mobile computing device 380 into a sufficient proximity of) the network-enabled printer 385. When the network-enabled printer 385 detects and determines that the mobile computing device 380 is brought into sufficient proximity of the network-enabled printer 385, the network-enabled printer 385 can receive the user's account information corresponding to the user's mobile wallet account. The network-enabled printer 385 and/or the application running on the mobile computing device 380 can provide information about the user's renewal and/or selection of a new plan to the subscription manager 310.

The plan manager of the subscription manager 310 can then modify or edit the user's profile 361 with the newly selected subscription plan. For payment purposes, the payment component of the subscription manager 310 can then communicate a payment amount 317 with the appropriate mobile payment resource 390 using the user's credential 325. The payment component can charge the user based on the user's automatic renewal plan or based on the user's manual renewal of a plan, receive payment for the subscription service by deducting the appropriate amount for the plan from the user's mobile wallet account, and update the user's profile 361 with the payment transaction information.

Methodology

Figure 4:
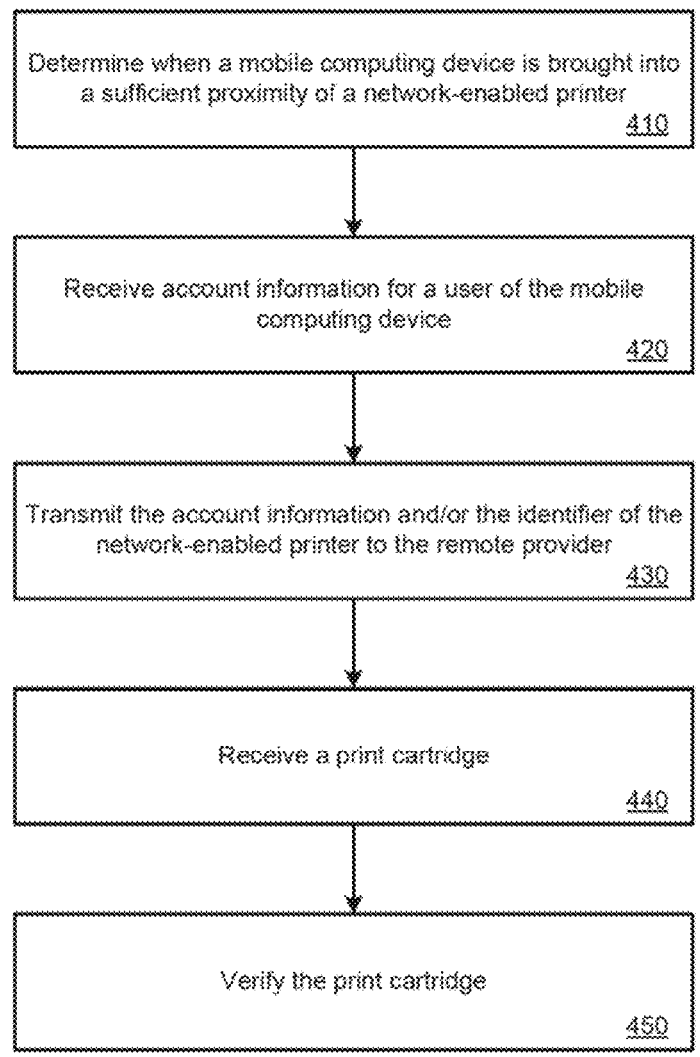
FIG. 4 illustrates an example method for registering a user with a subscription service.

FIG. 4 illustrates an example method for registering a user with a subscription service. A method such as described by an example of FIG. 4 can be implemented using, for example, components described with examples of FIGS. 1 through 3. Accordingly, references made to elements of FIGS. 1 through 3 are for purposes of illustrating a suitable element or component for performing a step or sub-step being described.

As discussed, a user can operate a mobile computing device 120 in connection with performing a registration process for a subscription service. The registration process can require the user to create an account or profile with a remote service provider and provide user information, such as the user's name, email address, and password for an account with the remote service provider. The user, however, may not want to spend a long period of time to look up his or her payment information, such as a credit card number, an expiration date, and/or security code. The user can determine to provide the user's payment information, the billing information, and/or the shipping information using his or her mobile wallet account.

In order for the remote service provider to obtain the user's payment information, billing information, and/or shipping information for purposes of registration, the user can (instead of manually entering the information via a portal) perform a user action with the user's mobile computing device 120 (that is associated with the user's mobile wallet account) with respect to the user's printer. Referring to FIG. 4, the network-enabled printer, such as printer 110 of FIG. 1, can determine when a mobile computing device 120 of the user is brought into a sufficient proximity of the network-enabled printer 110 (410). For example, the network-enabled printer 110 can include a designated region on the housing that corresponds to where the short-range wireless technology interface is positioned. The short-range wireless technology interface can correspond to, for example, Bluetooth interface, a near-field communication (NFC) interface or a radio frequency identification (RFID) interface that can detect and read a corresponding interface, tag, or chip.

When the network-enabled printer 110 determines that the mobile computing device 120 is brought into sufficient proximity of the network-enabled printer 110, the network-enabled printer 110 can receive user account information from the mobile computing device 120 (420). The account information can be received using the short-range wireless technology interfaces of the network-enabled printer 110 and the mobile computing device 120. In one example, the account information for the user that is associated with the mobile wallet account of the mobile payment resource can correspond to or include (i) information about the mobile payment resource, the user's user name or email address, and/or the user's password associated with the user's mobile wallet account, and/or (ii) information corresponding to the subscriber identification module (SIM) card or another device identifier of the mobile computing device 120.

In response to receiving the user's account information, the network-enabled printer 110 can transmit the received account information to the remote service provider and/or the printer ID of the network-enabled printer (and/or other information for enabling the remote service provider to determine the user's account with the subscription service) (430). The user's account information and/or the printer ID enables the remote service provider 140 to (i) communicate with the appropriate mobile payment resource of the user (which the user has a mobile wallet account with) to obtain, determine, and/or verify payment information, billing, and/or shipping information for the user, and (ii) complete registration for the user and the network-enabled printer 110 with the subscription service.

After completion of the registration process, the remote service provider can mail an ink or toner cartridge that can be used by the network-enabled printer. The network-enabled printer 110 can receive the ink or toner cartridge (e.g., the user can insert the cartridge in the printer 110) and the printer 110 can detect the cartridge and the cartridge capabilities (including authentication information of the cartridge) (440). The network-enabled printer 110 can verify the cartridge based on the cartridge information included with the cartridge (450). If the cartridge is verified, the user can perform print operations using the printer 110.

Hardware Diagram

Figure 5:
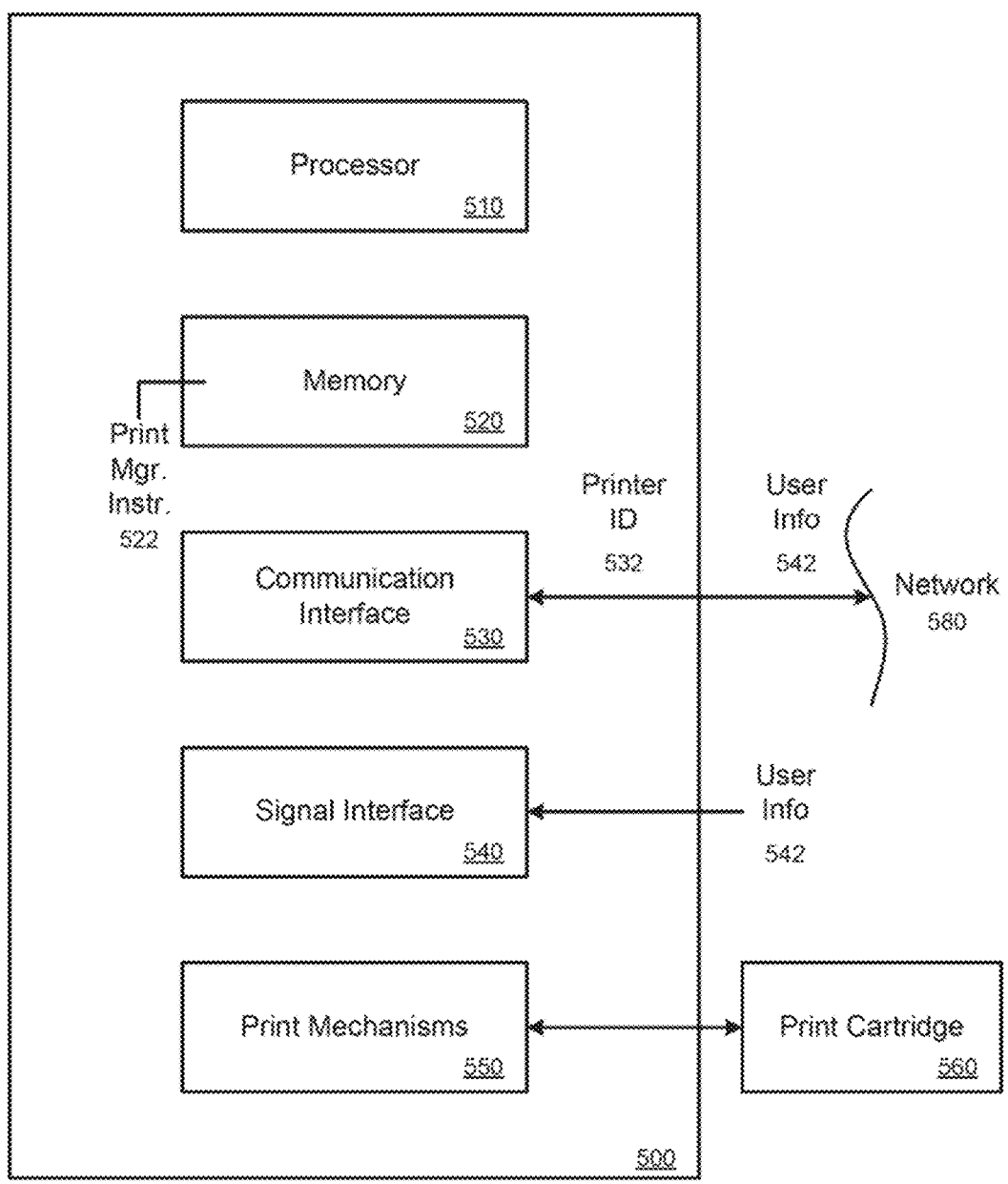
FIG. 5 is a block diagram that illustrates a network-enabled upon which examples described herein may be implemented.

FIG. 5 is a block diagram that illustrates a network-enabled printer upon which examples described herein may be implemented. For example, the network-enabled printer 110 of FIG. 1 may be implemented using a network-enabled printer 500 such as described in FIG. 5. The network-enabled printer 500 can correspond to a laser printer, an inkjet printer, a multifunction printer, etc., and can include other components and perform other functionalities (e.g., scanning, photo-copying, faxing functionalities, etc.) now shown in FIG. 5.

In one implementation, network-enabled printer 500 includes processing resources 510, memory resources 520, and a communication interface 530. Network-enabled printer 500 includes at least one processor 510 for processing information and a memory 520, such as a random access memory (RAM) or other dynamic storage device, for storing information and instructions to be executed by the processor 510. The memory 520 also may be used for storing temporary variables or other intermediate information during execution of instructions to be executed by processor 510. The memory 520 can correspond to a computer-readable medium that stores print manager instructions 522 that, when executed by processor 510, may cause network-enabled printer 500 to perform operations described below and/or described above with respect to FIGS. 1 through 3 (e.g., operations of the network-enabled printer 110, system 200 described above). In addition, among other data and instructions, the memory 520 can store instructions for enabling the processor 510 to implement functionality for use with the signal interface 540 and the print mechanisms 550 of the network-enabled printer 500. The memory 520 can also store information about network-enabled printer 500, such as model information, firmware version information, an address or identifier of network-enabled printer 500, etc., as well as configuration information for print operations that are performed by network-enabled printer 500.

The communication interface 530 can enable network-enabled printer 500 to communicate with one or more networks 580 (e.g., computer network, cellular network, etc.) through use of the network link (wireless or wireline). Using the network link, network-enabled printer 500 can communicate with one or more remote service providers and/or with one or more computing devices (e.g., a user's personal computer). In some examples, network-enabled printer 500 can communicate with a service provider, such as a service provider that provides a printer cartridge subscription service, to receive information about network services and/or device services that network-enabled printer 500 has access to and to transmit status or report information about network-enabled printer 500.

Network-enabled printer 500 can also include a signal interface 540, such as a short-range wireless technology interface, to communicate with another computing device. Depending on implementation, the signal interface 540 can correspond to a Bluetooth interface, a near-field communication (NFC) interface, or a radio frequency identification (RFID) interface. The signal interface 540 can receive user information 542, such as account information for a user from the user's mobile computing device, when the mobile computing device is brought into the sufficient proximity to the signal interface 540. The processor 510 can transmit, over the network 580, the printer identifier (ID) of network-enabled printer 500 and/or the user information 542 to the service provider for purposes of registering or authorizing payment for the user with the subscription service. In this manner, network-enabled printer 500 can provide a mechanism to enable the user to register with a subscription service using the signal interface 540.

The processor 510 can implement controller functionality to control the signal interface 540 as well as the print mechanisms 550 of network-enabled printer 500. The print mechanisms 550 can include a cartridge retention mechanism (e.g., a mechanism to retain a depletable resource such as ink, an ink cartridge, toner, etc.), one or more sensors, processing resources, and/or other hardware to enable the processor 510 to control and manage access of the print cartridge 560. In managing the depletable resource (e.g., ink cartridge), such as the ink or toner level, the processor 510 can communicate, using the network link 580, with the service provider, such as a service provider that provides a printer cartridge subscription service.

Network-enabled printer 500 can also include a display for displaying graphics and information to a user and input mechanisms to receive user input (not shown in FIG. 5). In some examples, the display can be a touch-sensitive display to receive user input.

Examples described herein are related to the use of network-enabled printer 500 for implementing the techniques described herein. According to one example, those techniques are performed by network-enabled printer 500 in response to processor 410 executing one or more sequences of one or more instructions contained in the memory 520. Such instructions may be read into the memory 520 from another machine-readable medium, such as storage device. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method comprising:
   determining, by a network-connected printer, that a mobile computing device has been brought into sufficient proximity of the network-connected printer by a radio frequency identification (RFID) interface of the network-connected printer detecting an RFID tag of the mobile computing device;
   responsive to determining that the mobile computing device has been brought into sufficient proximity of the network-connected printer, receiving, by the network-connected printer from the mobile computing device via the RFID interface of the network-connected printer, account information for a user of the mobile computing device, the account information associated with a mobile payment resource with which the user has an account that was previously configured with payment information and shipping information of the user; and
   transmitting, by the network-connected printer, the account information to a remote provider to register the network-connected printer and the user with an automatic printer consumable item subscription service by which a new printer consumable item is automatically shipped to the user as indicated by the shipping information responsive to an existing printer consumable item currently installed in the network-connected printer having to be replenished,
   wherein the method permits the user to sign up for the automatic printer consumable item subscription service via bringing the mobile computing device into sufficient proximity of the network-connected printer and without having to reenter the payment information or the shipping information.

2. The method of claim 1, wherein the RFID tag comprises a near-field communication (NFC) tag network.

3. The method of claim 1, wherein the account information for the user comprises at least one of (i) a user name or email address, or (ii) a password, each being associated with the account with the mobile payment resource to enable the remote provider to communicate with the mobile payment resource.

4. The method of claim 3, wherein the account information enables the remote provider to (i) communicate with the mobile payment resource to verify payment information for the user, and (ii) register the network connected printer and the user with the subscription service using the verified payment information.

5. The method of claim 1, further comprising:
   receiving a print cartridge to enable the network connected printer to perform print operations, the print cartridge being provided by the remote provider in connection with the subscription service; and
   verifying the print cartridge.

6. A non-transitory computer-readable medium storing instructions that, when executed by a network-connected printer, causes the network-connected printer to perform operations comprising:
   determining that a mobile computing device has been brought into sufficient proximity of the network-connected printer by a radio frequency identification (RFID) interface of the network-connected printer detecting an RFID tag of the mobile computing device;
   responsive to determining that the mobile computing device has been brought into sufficient proximity of the network-connected printer, receiving, from the mobile computing device via the RFID interface of the network-connected printer, account information for a user of the mobile computing device, the account information associated with a mobile payment resource with which the user has an account that was previously configured with payment information and shipping information of the user; and
   transmitting the account information to a remote provider to register the network-connected printer and the user with an automatic printer consumable item subscription service by which a new printer consumable item is automatically shipped to the user as indicated by the shipping information responsive to an existing printer consumable item currently installed in the network-connected printer having to be replenished,
   wherein the processing permits the user to sign up for the automatic printer consumable item subscription service via bringing the mobile computing device into sufficient proximity of the network-connected printer and without having to reenter the payment information or the shipping information.

7. The non-transitory computer-readable medium of claim 6, wherein the RFID tag comprises a near-field communication (NFC) tag.

8. The non-transitory computer-readable medium of claim 6, wherein the account information for the user comprises at least one of (i) a user name or email address, (ii) a password, or (iii) a subscriber identification module information of the mobile computing device, each being associated with the account with the mobile payment resource to enable the remote provider to communicate with the mobile payment resource.

9. The non-transitory computer-readable medium of claim 8, wherein the account information enables the remote provider to (i) communicate with the mobile payment resource to verify payment information for the user, and (ii) register the network-connected printer and the user with the subscription service using the verified payment information.

10. A network-connected printer comprising:
    a housing having a designated region;
    a network interface;
    a radio frequency identification (RFID) interface positioned within the housing at the designated region;
    a processor coupled to the network interface and the RFID interface, the processor to perform processing comprising:
    determining that a mobile computing device has been brought into sufficient proximity of the network-connected printer by the RFID interface of the network-connected printer detecting an RFID tag of the mobile computing device;
    responsive to determining that the mobile computing device has been brought into sufficient proximity of the network-connected printer, receiving, from the mobile computing device via the RFID interface, account information for a user of the mobile computing device, the account information associated with a mobile payment resource with which the user has an account that was previously configured with payment information and shipping information of the user; and transmitting the account information to a remote provider to register the network-connected printer and the user with an automatic printer consumable item subscription service by which a new printer consumable item is automatically shipped to the user as indicated by the shipping information when an existing printer consumable item currently installed in the network-connected printer has to be replenished, wherein the processing permits the user to sign up for the automatic printer consumable item subscription service via bringing the mobile computing device into sufficient proximity of the network-connected printer and without having to reenter the payment information or the shipping information.

11. The network-connected printer of claim 10, wherein the RFID tag comprises a near-field communication (NFC) tag.

* * * * *